(12) United States Patent
Huber

(10) Patent No.: US 11,945,306 B2
(45) Date of Patent: Apr. 2, 2024

(54) METHOD FOR OPERATING A VISUAL FIELD DISPLAY DEVICE FOR A MOTOR VEHICLE

(71) Applicant: Bayerische Motoren Werke Aktiengesellschaft, Munich (DE)

(72) Inventor: Wolfgang-Andreas Huber, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 751 days.

(21) Appl. No.: 17/252,899

(22) PCT Filed: Jul. 18, 2019

(86) PCT No.: PCT/EP2019/069425
§ 371 (c)(1),
(2) Date: Dec. 16, 2020

(87) PCT Pub. No.: WO2020/030407
PCT Pub. Date: Feb. 13, 2020

(65) Prior Publication Data
US 2021/0260998 A1      Aug. 26, 2021

(30) Foreign Application Priority Data

Aug. 8, 2018   (DE) ..................... 10 2018 213 269.0

(51) Int. Cl.
*G02B 27/01*       (2006.01)
*B60K 35/00*       (2006.01)
(Continued)

(52) U.S. Cl.
CPC .............. *B60K 35/00* (2013.01); *G02B 5/003* (2013.01); *G02B 27/0018* (2013.01);
(Continued)

(58) Field of Classification Search
CPC ...... G02B 2027/012; G02B 2027/0121; G02B 27/0101; G02B 27/0018; G02B 27/0093;
(Continued)

(56) References Cited

U.S. PATENT DOCUMENTS

| 7,496,241 B1 | 2/2009 | Reneker et al. |
| 2006/0023078 A1 | 2/2006 | Schmitt et al. |

(Continued)

FOREIGN PATENT DOCUMENTS

| CN | 105988220 A | 10/2016 |
| CN | 107920238 A | 4/2018 |
| DE | 10 2009 054 232 A1 | 5/2011 |

OTHER PUBLICATIONS

International Search Report (PCT/ISA/210) issued in PCT Application No. PCT/EP2019/069425 dated Jan. 17, 2020 with English translation (seven (7) pages).

(Continued)

*Primary Examiner* — Ryan D Howard
(74) *Attorney, Agent, or Firm* — Crowell & Moring LLP

(57) ABSTRACT

A method operates a visual field display device, in particular for a motor vehicle, which is designed to produce a projection light beam with a display content and to project the display content onto a partially transparent reflecting projection screen, in particular a front window of the motor vehicle, such that a virtual display image which is superimposed into a field of vision of a user is generated behind it. The method determines image element edges having vertical or a vertical component in the virtual display image to be superimposed and tilts the image element edges thus determined to a respectively adapted tilt angle with respect to the vertical, such that double images of the respective image element edges in the virtual display image are offset with respect to each other in the horizontal direct for the user due (Continued)

to double reflections of the projection light beam on two optical boundaries of the projection screen and appear substantially sharp.

16 Claims, 7 Drawing Sheets

(51) Int. Cl.
    *G02B 5/00*       (2006.01)
    *G02B 27/00*     (2006.01)

(52) U.S. Cl.
    CPC ..... *G02B 27/0093* (2013.01); *G02B 27/0101* (2013.01); *B60K 2370/1529* (2019.05); *B60K 2370/31* (2019.05); *B60K 2370/334* (2019.05); *B60K 2370/347* (2019.05); *B60K 2370/785* (2019.05); *G02B 2027/0121* (2013.01); *G02B 2027/0134* (2013.01); *G02B 2027/0198* (2013.01)

(58) Field of Classification Search
    CPC ............ G02B 2027/0134; B60K 35/00; B60K 2370/1529; B60K 2370/1531
    See application file for complete search history.

(56) References Cited

U.S. PATENT DOCUMENTS

| | | |
|---|---|---|
| 2008/0089611 A1 | 4/2008 | McFadyen et al. |
| 2016/0234485 A1 | 8/2016 | Robbins et al. |
| 2016/0291324 A1* | 10/2016 | Arndt ...................... G02B 1/04 |
| 2017/0285339 A1 | 10/2017 | Spangler et al. |
| 2018/0188530 A1 | 7/2018 | Kasazumi et al. |

OTHER PUBLICATIONS

German-language Written Opinion (PCT/ISA/237) issued in PCT Application No. PCT/EP2019/069425 dated Jan. 17, 2020 (eight (8) pages).

German-language Search Report issued in German Application No. 10 2018 213 269.0 dated Apr. 1, 2019 with partial English translation (12 pages).

Chinese-language Office Action issued in Chinese Application No. 201980041512.3 dated Jan. 10, 2022 with English translation (20 pages).

\* cited by examiner

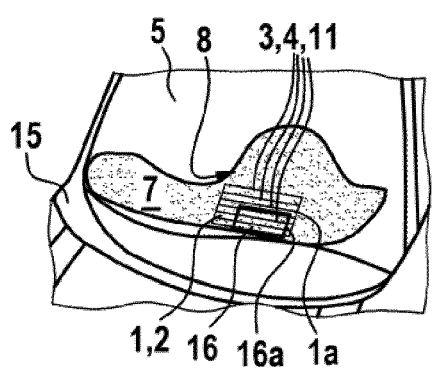
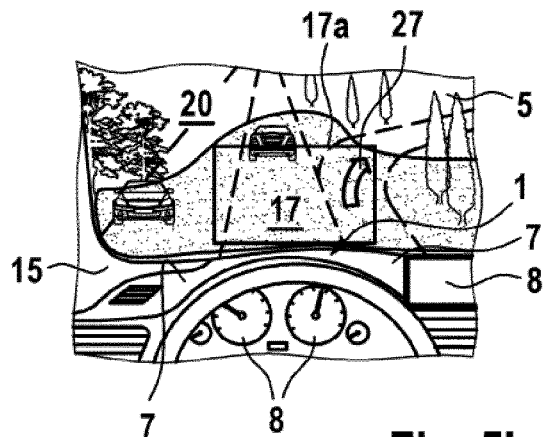
Fig. 5a  Fig. 5b
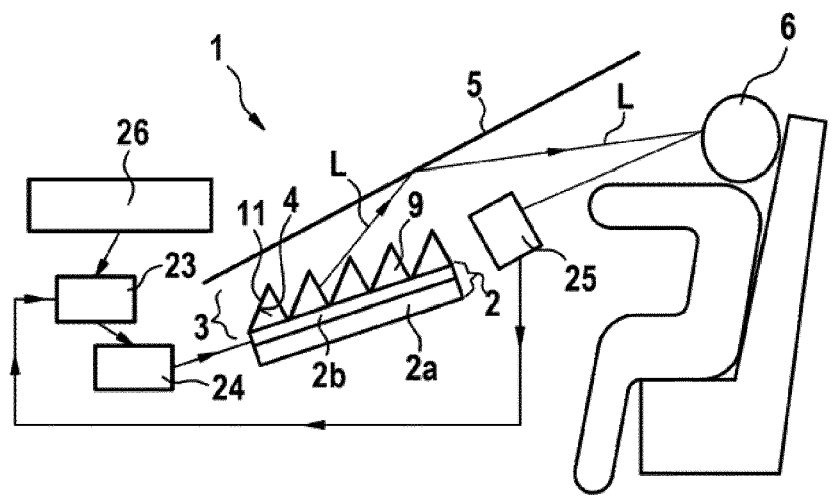
Fig. 6

METHOD FOR OPERATING A VISUAL FIELD DISPLAY DEVICE FOR A MOTOR VEHICLE

BACKGROUND AND SUMMARY OF THE INVENTION

The invention relates to a method for operating a visual field display apparatus, in particular a head-up display for a motor vehicle, as well as a corresponding control device and a motor vehicle equipped therewith. In particular, the present invention relates to measures for avoiding mutually offset double images in a virtual display image generated by the visual field display apparatus, the double images having been caused by double reflection of a projection light beam at two optical interfaces of a partly transparent reflecting projection screen.

Visual field display apparatuses in a motor vehicle are known, in particular, by the term head-up display (HUD). Using this, display content, such as information about a speed limit, is superimposed into the visual field of the driver in front of the motor vehicle as a virtual display image such that the driver need not avert their gaze from the road. To this end, a visual field display apparatus typically comprises a projection unit which generates a projection light beam with desired display content by way of a display housed below a dashboard upper side and a suitable projection optical unit and which projects this projection light beam onto a partly transparent projection screen, for example the windshield of the motor vehicle, from where it is reflected to the driver.

In this conventional structure, the HUD has a relatively small field of view which, as a rule, only reaches just as far as the horizon and the distance of the virtual display image from the windshield is defined by the optical structure of the projection unit. An increase in the field of view is prevented by the restricted installation space within the dashboard. In particular, the known projection optical unit requires much space in the vertical direction. The driver gazes, so to speak, into a telescope such that, to them, a close display image generated at the display in the HUD interior appears in the distance in front of the motor vehicle. Consequently, in a manner corresponding to an "opening of the telescope", only restricted solid angles in which the HUD image can be overlaid in the view through the windshield are displayable. Contact-analog superimpositions, as known from augmented reality, for example, are not possible outside of this restricted solid angle of the virtual HUD display image.

Secondly, DE 10 2009 054 232 A1, for example, has disclosed a head-up display for displaying information in stereoscopic fashion in a motor vehicle, which comprises image generation means for generating two different individual images provided for the two eyes of an occupant and a display unit on which luminous spots are generable, the light beams of which being visible to the occupant as a result of mirroring at the windshield of the motor vehicle. Further, deflection means such as a matrix-like arrangement of small lenses, for example, are provided in the beam path between the display unit and the windshield, the deflection means deflecting the light beams from different luminous spots in different emission directions. Moreover, pixel assignment means are provided for assigning pixels of the individual images to luminous points in the display unit. The opposite arrangement of the specified components and the specified assignment is such that the individual image provided for the left eye of the occupant is visible to said left eye and the individual image provided for the right eye of the occupant is visible to said right eye. Stereoscopic information display can be particularly advantageous for a contact-analog representation of the content.

As a rule, visual field display apparatuses are provided with additional measures for suppressing the interfering reflections of ambient light at their components, the interfering reflections possibly leading to a blinding of the user. To this end, a covering panel, for example, which seals the projection unit to the outside geometrically prevents reflections (a so-called glare trap) in conventional HUDs. However, antireflection techniques known therefrom are not suitable for a display arranged directly opposite the windshield.

A further problem is the creation of mutually offset double images in the virtual display image as a result of a double reflection of the projection light at two optical interfaces of the projection screen. A known countermeasure, for example for a horizontally narrow field of view, is that of forming the two optical interfaces of the projection screen with a vertical inclination with respect to one another by means of a wedge film in order to overlay double images of horizontal image element edges without an offset.

It is an object of the present invention to provide a solution for a visual field display apparatus, in particular for a motor vehicle, which is improved in view of overcoming mutually offset double images and, in particular, which is also well suited to a large field of view.

This object is achieved by a method for operating a visual field display apparatus, and by a corresponding control unit, a computer program, and a motor vehicle, according to the independent claims. Further configurations are specified in the dependent claims. All additional features and effects specified in the claims and the description for the method also apply in respect of the visual field display apparatus, the control unit, the computer program or the motor vehicle, and also vice versa.

According to a first aspect, a method for operating a visual field display apparatus, in particular for a motor vehicle, is provided. The visual field display apparatus is embodied to generate a projection light beam with display content and to project the latter onto a partly transparent reflecting projection screen, in particular a windshield of the motor vehicle, in such a way that a virtual display image superimposed into a visual field of a user (e.g., of the driver or any other occupant of the motor vehicle) is generated therebehind. The method comprises the following steps:

ascertaining vertical image element edges (in particular lines as well), or image element edges with a vertical component, in the virtual display image to be superimposed and tilting the ascertained vertical image element edges or image element edges with a vertical component to a respective tilt angle with respect to the vertical direction, which tilt angle is adapted in such a way that horizontally offset double images of the respective image element edges, which are caused by a double reflection of the projection light beam at two optical interfaces of the projection screen (e.g., the front and back surface thereof), are overlaid for the user in the virtual display image and consequently appear substantially sharp. (The term "substantially" herein can mean, in particular, a production or structure-caused possible deviation within the scope of the presented functional principle which, for example, might be no more than approximately 10% of relevant suitable measured variables).

In principle, this can also be a conventional visual field display apparatus, for example of the type described at the outset. However, the method is particularly useful for visual field display apparatuses with a horizontally broad usable solid angle (also referred to as the field of view herein) within the visual field of a user of the visual field display apparatus. This is because double images of vertical and oblique image element edges, which have a horizontal offset as a result of the aforementioned double reflection in the absence of countermeasures, may be bothersome in the virtual display image. This cannot be compensated as easily by a wedge film, as mentioned at the outset, like in the case of horizontal image element edges since a horizontal wedge for a field of view of, e.g., a half windshield length would turn out to be quite massive on the front seat passenger side.

Therefore, the present suggestion is that of overlaying the double images of vertical image element edges by aligning these with a respective tilt angle adapted in this way, at which they appear slightly tilted from the vertical direction in the virtual display image for the user but appear as sharp lines or edges in return. The same is also applicable to oblique image element edges, in particular in a straight line with vertical components.

By way of example, the principle can be applied to symbols (block arrows, boxes, etc.) and/or to lettering. By way of example, a suitable calculation algorithm can automatically, within the scope of the image generation, ascertain image element edges to be represented vertically or with a vertical component, calculate the respective adapted tilt angle and accordingly adapt the display content to be transported by the projection light beam.

According to a variant of the method, furthermore, a current position of the user, in particular an eye position or a visual axis of the user, is provided and the respective adapted tilt angle is ascertained on the basis of the provided current position of the user, in particular on the basis of a distance of the respective ascertained vertical image element edge or of the respective ascertained image element edge with a vertical component from the visual axis of the user. As a result, the method can be further simplified and/or refined, for example.

In a specific configuration, the projection screen additionally comprises an inclination element arranged between the two optical interfaces, in particular a wedge film, which is embodied to overlay vertically offset double images in the virtual display image to be superimposed for the purposes of avoiding vertically offset double images of horizontal image element edges or image element edges with a horizontal component, the double images having been caused by the double reflection of the projection light beam at the two optical interfaces.

As an alternative or in addition thereto, vertically offset double images of horizontal image element edges or of image element edges with a horizontal component can be hidden from the user in the virtual display image to be superimposed by virtue of the respective image elements being provided with a texture having horizontal components.

According to one embodiment, the visual field display apparatus comprises:
an electrically drivable planar pixel arrangement, in particular one or more one flat screens or any other two-dimensional pixel matrix, for generating the projection light beam with display content, and
a reflection-suppressing deflection arrangement arranged on the planar pixel arrangement and comprising one or more planar reflection surface(s), which extend along the planar pixel arrangement at a predefined acute angle thereto and parallel to one another, for the purposes of projecting the generated projection light beam on the projection screen.

Here, the one or more reflection surface(s) have a light-absorbing embodiment on their back side(s) for the purposes of suppressing interfering reflections.

In contrast to the conventional HUD structure with a projection optical unit housed in the interior of the instrument panel of a motor vehicle, as set forth at the outset, a visual field display apparatus according to this embodiment has a significantly flatter structure and can be installed with an installation depth of only a few cm in an upper side of the instrument panel or can subsequently be assembled thereon, for example. This facilitates a significant expansion in the field of view of the visual field display apparatus, for example also significantly beyond the horizon in the vertical direction, which is particularly suitable for contact-analog representations for the driver and other occupants for the purposes of assisting navigation or within the scope of autonomous driving. In particular, this allows a true contact-analog 3D effect (stereo augmented reality).

Here, the term "planar" means, very generally, that the pixel arrangement extends over an area that, at least in regions, can be flat or else curved or arched. In particular, the planar pixel arrangement can be matched to arching of the upper side of the instrument panel of a motor vehicle where necessary, for example by virtue of being constructed in stepped or nested fashion from a plurality of smaller partial areas, such as, e.g., flat displays.

The plurality of mutually parallel reflection surfaces of the reflection-suppressing deflection arrangement can each have the same embodiment or else can differ from one another in terms of form or size. Depending on the form or size thereof, the spacing thereof in a direction perpendicular to the direction of extent thereof can be chosen such that virtually complete interfering reflection suppression and a substantially loss-free and form-maintaining deflection of the projection light beam are ensured. A few examples to this end are specified below. In principle, any sun light-absorbing coating known per se, for example a matte black layer, is suitable for the back sides of the reflection surfaces.

According to a development of this embodiment, at least one of the reflection surfaces of the reflection-suppressing deflection arrangement is formed by a lateral side of a prism, in particular with a triangular cross-sectional area, arranged on the planar pixel arrangement. This can impart great mechanical stability, in particular, to the respective reflection surface. The prism can be manufactured from any material transparent to the projection light employed, in particular from a glass or plastic. In the case of an air layer between the reflection surface and the light-absorbing back side thereof, the reflection can arise as a result of total internal reflection at the specified lateral side of the prism; otherwise, a reflecting layer, for example made of metal, and, on the latter, a light-absorbing layer can be applied on the prism.

For respectively two adjacent reflection surfaces, a light emergence plane, which connects an upper edge of the one reflection surface to the lower edge of the back side of the next reflection surface, is aligned substantially perpendicular to the projection screen during the operation of the visual field display apparatus in a specific configuration. In particular, this can lead to a complete interfering reflection suppression for ambient light from all directions.

In a specific configuration, upper edges of the plurality of mutually parallel reflection surfaces of the reflection-suppressing deflection arrangement lie substantially along one line from the view of the user, for example in order to conceal the reflection surfaces from a direct view of the user. In particular, this can be adjustable by means of a suitable lift/tilt device for the reflection-suppression deflection arrangement or the planar pixel arrangement, either manually or at least partly automatically, for example by way of the eye tracking. To this end, the method can comprise, in particular, the following additional steps:

providing a current position, in particular an eye position or a direction of view, of the user and aligning upper edges of the plurality of mutually parallel reflection surfaces of the reflection-suppressing deflection arrangement substantially along a line leading to the eyes of the user on the basis of the current user position provided.

In a specific configuration, the planar pixel arrangement comprises at least one autostereoscopic screen and/or at least one 2D screen and the method comprises the further steps of:

capturing current surroundings behind the projection screen, in particular surroundings ahead of the motor vehicle; and superimposing contact-analog information, in particular virtual object images and/or object markings, into the visual field of the user by way of the at least one autostereoscopic screen and/or the at least one 2D screen on the basis of the captured surroundings, in particular for assisting the user during navigation or for clarifying a driving situation in the case of highly automated or fully automated driving (HAD/FAD).

In a further specific configuration according to the aforementioned embodiment, the visual field display apparatus additionally also comprises a conventional type projection unit, as set forth at the outset, for generating a further virtual display image superimposed in a visual field of the user (this is referred to as a hybrid approach herein). That is to say, the projection unit comprises, in its interior, both an imaging unit for generating a further projection light beam with further display content and a projection optical unit, arranged opposite the imaging unit, for projecting the generated further projection light beam onto a portion of the projection screen. Here, the planar pixel arrangement with the reflection-suppressing deflection arrangement arranged thereon is arranged, for example, next to a light emergence opening of the projection unit, in particular directly adjoining the latter and/or around the latter and/or flush with the edge of the latter. As a result, conventional HUD technology can be combined with the aforementioned technology in order to be used concurrently or alternatively (also referred to as hybrid approach herein), depending on the situation. Here, the method comprises the further steps of:

providing system state data of a moving overarching system (in particular a motor vehicle) in which the visual field display apparatus is assembled, and/or providing route data for a route section ahead; and statically superimposing predetermined information into the visual field of the user, in particular in a manner independent of real objects behind the projection screen in the representation, by way of the projection unit and/or the at least one autostereoscopic screen and/or the at least one 2D screen of the planar pixel arrangement on the basis of the provided system state data and route data.

By way of example, the predefined static information can be alerts in the case of a critical charge state of an energy accumulator or a critical fill level of a fuel tank on board or in the case of upcoming adverse weather or it can be a display of a current speed limit or the exceeding thereof, etc.

According to a further aspect, provision is made of a computer program which, when executed in a control unit, is configured to carry out a method of the type presented herein.

According to a further aspect, provision is made of a control unit for a visual field display apparatus, wherein the control unit is embodied to carry out a method of the type presented herein.

According to a further aspect, provision is made of a motor vehicle comprising an upper side of an instrument panel extending between a windshield of the motor vehicle and the instrument panel;

a visual field display apparatus, arranged on, in or under the upper side of the instrument panel, for superimposing a virtual display image into a visual field of the driver and/or further occupants, in which, in particular, an electrically drivable planar pixel arrangement of the aforementioned type or a reflection suppressing deflection arrangement, arranged thereon, of the aforementioned type is arranged substantially flush with the upper side of the instrument panel.

In particular, the motor vehicle can, in this case, further comprise a control unit of the type presented herein.

The aforementioned aspects of the invention and the embodiments and specific configurations thereof are explained in more detail below on the basis of the examples illustrated in the attached drawings. The drawings are purely schematic; in particular, they should not be read as true to scale. Similar or corresponding elements are provided with the same reference signs therein.

BRIEF DESCRIPTION OF THE DRAWINGS

FIG. 5a shows a perspective view of a possible arrangement of a visual field display apparatus according to the above embodiment, in an upper side of an instrument panel of a motor vehicle;

FIG. 5b shows a perspective view of a projection region, usable by the visual field display apparatus of FIG. 5a, in the windshield of the motor vehicle from the view of the driver with a virtual turning arrow superimposed in contact-analog fashion;

FIG. 6 shows a schematic lateral cross-sectional view of a visual field display apparatus according to the above embodiment, comprising driving components for its planar pixel arrangement for the purposes of generating a true contact-analog 3D effect for the user;

DETAILED DESCRIPTION OF THE DRAWINGS

All specific details and variants of the operating method for a visual field display apparatus according to the first aspect of the invention, in particular various configuration features of the relevant visual field display apparatus according to the above embodiment, specified above and below in the description and the claims can be implemented in the examples shown in FIGS. 1 to 11. Conversely, the specific examples shown in FIGS. 1 to 11 should only be understood to be a simplified, clarifying illustration of the features defined more generally in the description and the claims.

Figure 1:
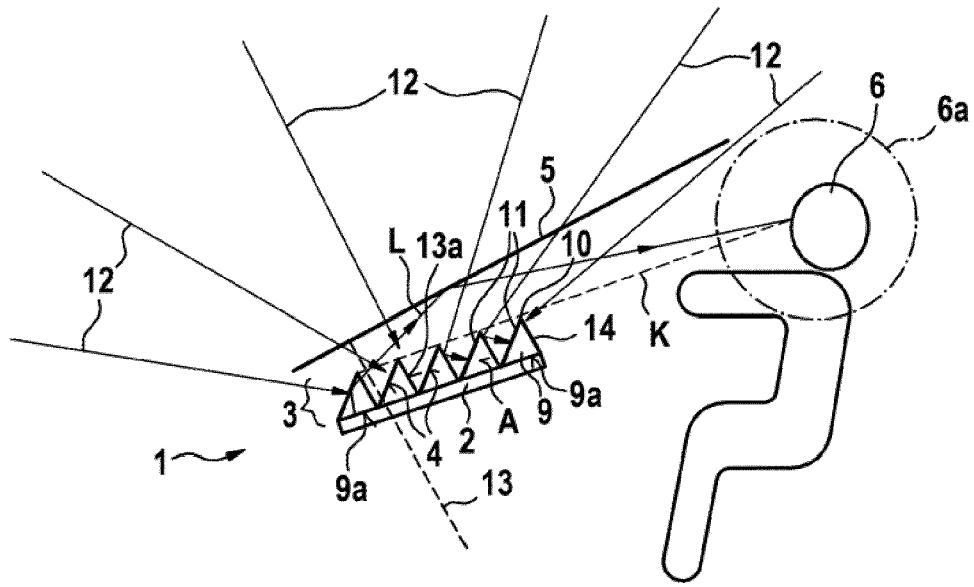
FIG. 1 shows a schematic lateral cross-sectional view of a visual field display apparatus according to the above embodiment of the invention.

FIG. 1 shows, in a much simplified schematic vertical cross-sectional view, a visual field display apparatus 1 according to the above embodiment of the invention in a motor vehicle (not illustrated in FIG. 1; cf. FIGS. 2a-2d and 5a-5b), in particular a head-up display. The method according to the invention is explained further below with reference to FIGS. 10 and 11.

The visual field display apparatus 1 comprises an electrically drivable planar pixel arrangement 2, which generates a projection light beam L with desired display content during operation. Further, the visual field display apparatus 1 comprises a reflection-suppression deflection arrangement 3, which is arranged on the planar pixel arrangement 2 and which, in this example, comprises a plurality of plane reflection surfaces 4 (five purely by way of example) which extend along the planar pixel arrangement 2 at a predefined acute angle thereto and parallel to one another. As a result of deflecting the projection light beam L at the reflection surfaces 4, it is projected onto a windshield 5 of the motor vehicle and reflected by the latter to the eyes of a user 6 (indicated by arrows), in particular of the driver or front seat passenger. As a result, a virtual display image superimposed in a visual field of the user 6 arises behind the windshield 5 (cf. FIGS. 5b, 7 and 8) and is superimposed on real surroundings in front of the motor vehicle observed through the windshield 5 for the user 6. The predefined acute angle of incidence of the reflection surfaces 4 can be set to this end in an application-specific manner, for example from the opposing geometric arrangement of the planar pixel arrangement 2, the windshield 5, and the user 6. Here, on the back sides 11 thereof, the reflection surfaces 4 have a complete light-absorbing embodiment for the purposes of suppressing interfering reflections.

By way of example, the visual field display apparatus 1 can be assembled in or on an upper side 7 of an instrument panel 8 (not illustrated in FIG. 1; cf. FIGS. 2a-2d and 5a) of the motor vehicle between the windshield 5 and the instrument panel 8, or in or on a steering wheel. Here, at least in sections, the planar pixel arrangement 2 or the reflection-suppressing deflection arrangement 3 can be arranged, for example, substantially flush with the upper side 7 of the instrument panel 8, which may be particularly inconspicuous, offer protection to the optical components or the user 6, and/or save space.

In FIG. 1, all reflection surfaces 4 for the reflection-suppressing deflection arrangement 3 are formed, purely by way of illustration, by lateral sides of prisms 9 made of glass or plastic that are resting on the planar pixel arrangement 2. This can yield a particularly robust structure of the visual field display apparatus 1 and can protect both the planar pixel arrangement 2 and the reflection surfaces 4 from damage and protect the user 6 from injury on exposed edges. In particular, the exposed, upper prism edges 10 can additionally be rounded or chamfered and, in particular, likewise have a light-absorbing embodiment to this end, for example in similar fashion to and for the same purpose as the back sides of the reflection surfaces.

In particular, the respective prism 9 in FIG. 1 has a triangular cross-sectional area A such that its other, lower lateral side 9a rests on the planar pixel arrangement 2 while its third lateral side serves as a light emergence surface 13a for the deflected projection light beam L. The light emergence surfaces 13a can be provided with a suitable antireflection coating, in particular from the outside. In FIG. 1, the lateral sides 9a of the prisms 9 resting on the planar pixel arrangement 2 directly adjoin one another in purely exemplary fashion.

In the geometric arrangement of the reflection surfaces 4 shown in FIG. 1, it is possible, in particular, to achieve a virtually complete suppression of interfering reflections of the ambient light 12 from any direction from outside and within the vehicle by way of the light-absorbing back sides 11 of the reflection surfaces, as indicated symbolically in FIG. 1 by an interference reflection-free region 6a around the user 6. To this end, for example, light emergence planes 13, which for respectively two adjacent reflection surfaces 4 connect an upper edge of the one reflection surface to the lower edge of the back side 11 of the next reflection surface and in which the light emergence surfaces 13a of the prisms 9 are located in this example, can be aligned substantially perpendicular to the windshield 5. In particular, the reflection surfaces 4 and their light-absorbing back sides 11 are located directly on the planar pixel arrangement 2 with their lower edges in this example, the planar pixel arrangement 2 possibly also comprising a protective cover layer, etc., where necessary.

Furthermore, in FIG. 1, a front reflection surface 4 located closest to the user 6 is concealed by a darkened or light-absorbing cover surface 14 in the direction of view of the user 6 in order to prevent the user from being blinded thereby. In this example, the cover surface 14 covers a lateral side of the front prism 9 facing the user 6. In particular, the same coating as used for the light-absorbing back sides 11 of the reflection surfaces 4, for example a black matte coating, is suitable for the cover surface 14. As an alternative, a separate cover surface arranged in front of the front reflection surface 4 in the direction of the user can also be provided for the same purpose, and so the specified reflection surface 4 is usable for the purposes of deflecting the projection light.

Moreover, in FIG. 1, upper edges of the reflection surfaces 4 are located, purely by way of example, substantially along a line K from the view of the user 6 of the visual field display apparatus 1.

Figure 2A:
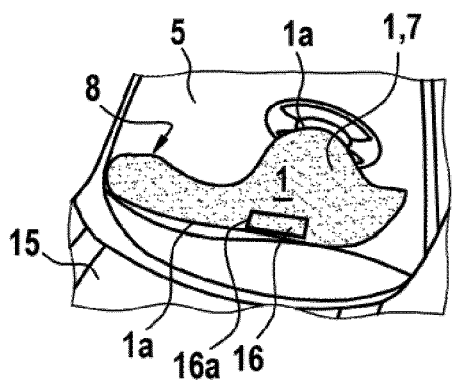
FIG. 2a shows a perspective view of a possible extent of a visual field display apparatus according to the above embodiment in an upper side of an instrument panel of a motor vehicle.

FIG. 2a schematically shows a perspective view of a possible extent of a visual field display apparatus 1 according to the above embodiment of the invention, in particular according to FIG. 1, in an upper side 7 of an instrument panel 8 of a motor vehicle 15. An overall height of the visual field display apparatus 1 in a direction perpendicular to the planar pixel arrangement 2 can be, in particular, only a few cm, for example between 0.5 and 10 cm, in particular between 1 and 7 cm, e.g., approximately 2, 3, 4, 5 or 6 cm. On account of a corresponding small installation depth of the visual field display apparatus 1, it can, in principle, assume an entire area of the upper side 7 of the instrument panel 8 of the motor vehicle 15 in front of the windshield 5, as indicated by its possible contour 1a in FIG. 2a. For comparison purposes, FIG. 2a indicates a light emergence opening 16 and its edge 16a in the case of a conventional projection unit of an HUD, as set forth at the outset, with a projection optical unit (not shown) housed below the upper side 7 of the instrument panel 8.

Figure 2B:
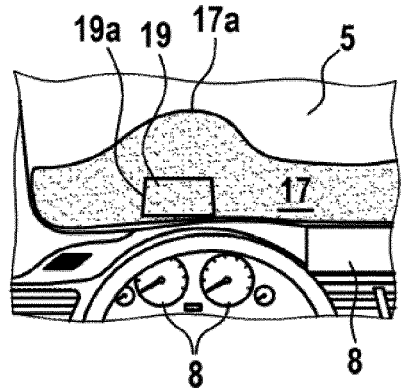
FIGS. 2b and 2d each show a perspective view of a projection region, usable by the visual field display apparatus of FIG. 2a, in the windshield of the motor vehicle from the view of the driver.
Figure 2C:
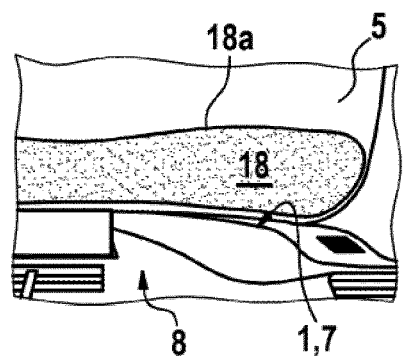
FIG. 2c shows a perspective view of a projection region, usable by the visual field display apparatus of FIG. 2a, in the windshield of the motor vehicle from the front passenger view.
Figure 2D:
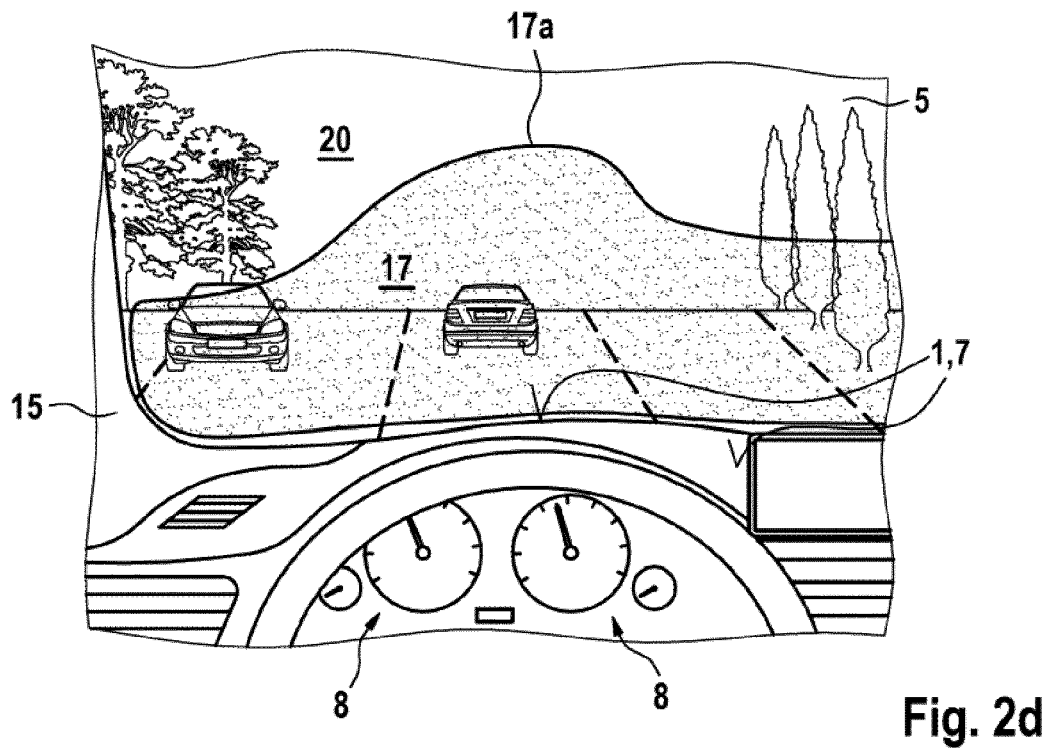

FIGS. 2b and 2d each schematically show, from the view of the driver, a perspective view of a projection region 17 of the windshield 5 of the motor vehicle 15 that is usable by the visual field display apparatus 1 of FIG. 2a, the boundary 17a of the projection region corresponding to the contour 1a of the visual field display apparatus 1. Once again, a projection region 19 corresponding to the light emergence opening 16 of a conventional projection unit and its boundary 19a are indicated for comparison purposes. In contrast to the latter, the projection region 17 usable by the visual field display apparatus 1 can identifiably reach significantly above the horizon in the upward direction and can also laterally cover a majority of the road region in front of the windshield 5 to be observed by the driver.

FIG. 2c schematically shows, from the view of a front seat passenger, a perspective view of a projection region 18 of the windshield 5 of the motor vehicle 15 that is usable by the visual field display apparatus 1 of FIG. 2a, the boundary 18a of the projection region corresponding to the contour 1a of the visual field display apparatus 1. As can easily be identified herefrom, the effects of the visual field display apparatus 1 specified above for the driver are equally usable by the front seat passenger. A similar statement applies accordingly to further occupants of the motor vehicle 15, for example from a rear compartment lounge position. Overall, multi-user use of the visual field display apparatus 1 is therefore possible. If the content should be only seen by one user in each case, the pixel matrix of the planar pixel arrangement 2 should be driven by way of the evaluation of an eye tracking for all considered users, in such a way that the image can only be seen by the relevant user.

Figures 3A, 3B:
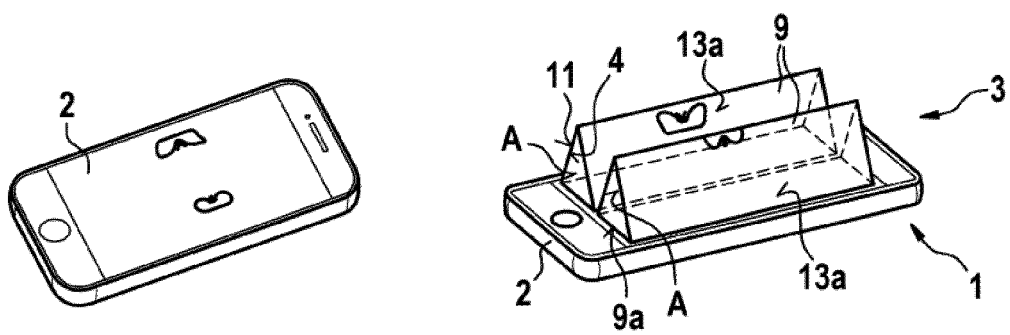
FIGS. 3a to 3c show perspective views of a model example of a visual field display apparatus according to the above embodiment, for the purposes of explaining the deflection effect of its reflection-suppressing deflection arrangement with a plurality of prisms.
Figure 3C:
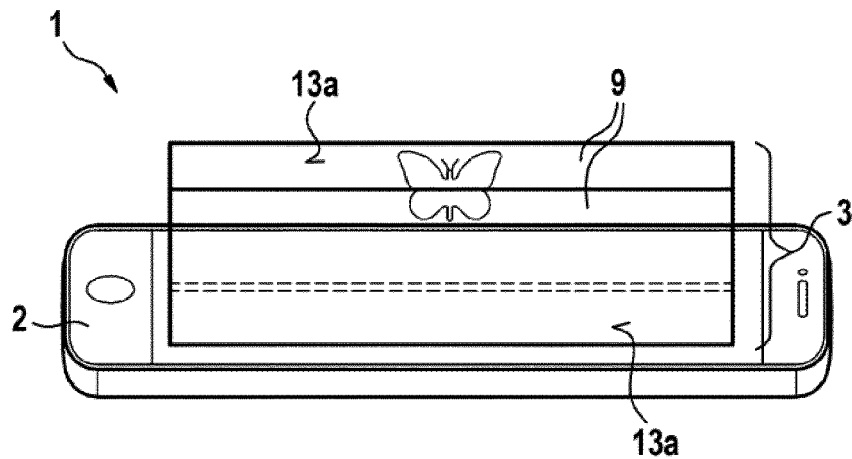

FIGS. 3a to 3c show, respectively in a perspective view, a much simplified model example of a visual field display apparatus 1 according to the above embodiment (for example, according to FIG. 1) for the purposes of explaining the deflection effect of its reflection-suppressing deflection arrangement 3, the reflection surfaces 4 of which are formed in this model by back lateral sides, distant from the observer or user, of two prisms 9 with triangular cross-sectional areas A.

In this model example, the planar pixel arrangement 2 is embodied as a flat screen which generates desired display content, the two-dimensional image of a butterfly shown in FIG. 3a within the scope of this example, said image being transported by the projection light beam L emanating from the flat screen (cf. FIG. 1). When passing the reflection-suppressing deflection arrangement 3 arranged on the planar pixel arrangement 2, the projection light beam L is deflected at the reflection surfaces 4 of the back lateral sides of the prisms 9 in order, for example like in FIG. 1, to reach the windshield 5 of the motor vehicle and, after a reflection by the latter, the eyes of the user 6.

As can be seen in FIG. 3b, the projection light beam L input coupled by the lower lateral sides 9a of the prisms 9 emerges from the light emergence surfaces 13a thereof, while the back sides 11 of the reflection surfaces 4 have a light-absorbing embodiment for the ambient light in order to suppress interfering reflections. As shown in FIG. 3c, the projection light beam L coupled into the reflection-suppressing deflection arrangement 3 leaves the light emergence surfaces 13a of the prisms 9 substantially without loss of brightness and, in the case of a suitable actuation of the planar pixel arrangement 2 as in FIG. 3a, without loss of shape either.

Figure 4A:
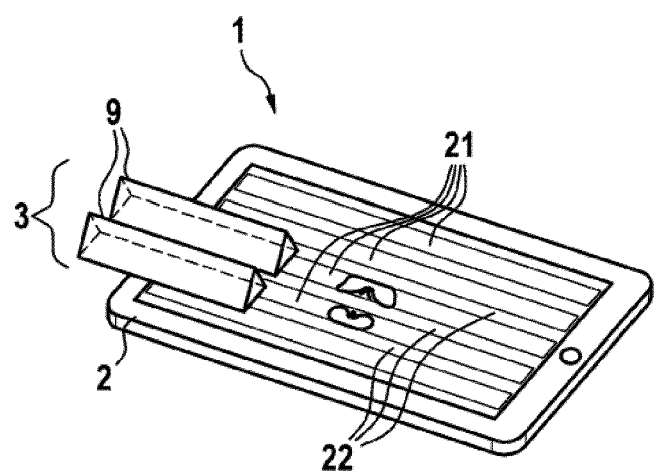
FIGS. 4a and 4b show perspective views of a further model example of a visual field display apparatus according to the above embodiment, for the purposes of explaining how visible and invisible stripes arise in an area containing the planar pixel arrangement.
Figure 4B:
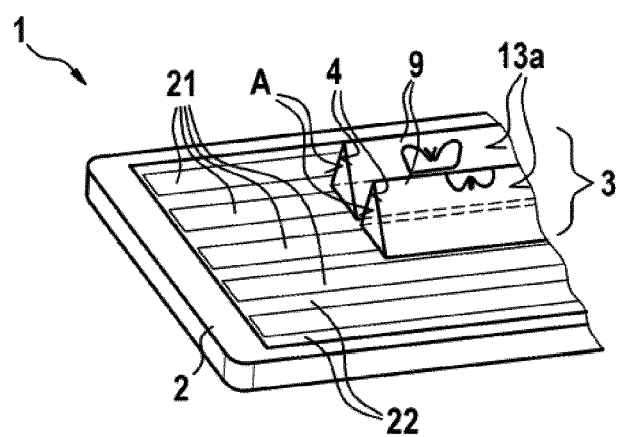

FIGS. 4a and 4b each show, in a perspective view, a further greatly simplified model example of a visual field display apparatus 1 according to the above embodiment (for example, according to FIG. 1), for the purposes of explaining the creation of visible and invisible stripes in an area containing the planar pixel arrangement 2. Like in FIGS. 3a-3c, the planar pixel arrangement 2 is also embodied as a flat screen in this case, which generates desired display content, the two-dimensional image of a butterfly shown in FIG. 4a in this example. In this model example, the reflection-suppressing deflection arrangement 3 arranged on the planar pixel arrangement 2 is also formed by prisms 9 resting on the flat screen, the long sides of the prisms adjoining one another, in a manner analogous to FIGS. 3b-3c; for reasons of simplicity, only two of possibly more than two prisms have been shown in this case as well.

As additionally indicated in FIGS. 4a and 4b, stripes 21 extend parallel to the reflection surfaces 4 of the prisms 9 in the pixel area, it being possible to make these parallel stripes visible to the user of the visual field display apparatus 1 by way of the deflection of the projection light at the reflection surfaces 4 of, in this case, up to five identical prisms 9. Stripes 22 that are invisible to the user of the visual field display apparatus 1 are located therebetween.

Therefore, the invisible stripes 22 in the pixel arrangement can be left black or else used for other functions, for example as an air outlet for a windshield heater or internal ventilation, as an opening for a sound source, as a light source for diffuse internal lighting or as an overlap region when nesting or staggering adjacent portions of a composed planar pixel arrangement.

In particular, to this end, a first reflection surface 4 furthest away from the user 6 can also be placed directly without a prism under a window base of the windshield 5 of the motor vehicle, for example in FIG. 1, and can be protected both mechanically and against possible user injury, unlike in the case of freestanding reflection surfaces. As an alternative to the omission of a prism 9, prism edges opposite to the respective reflection surfaces 4 can be cut off in a region corresponding to the invisible stripes 22, which is not passed by the projection light beam L, in the case of this reflection surface and/or other reflection surfaces 4 (and not only in this example). As a result, the invisible stripes 22, for example, can be used differently as mentioned and/or the weight and the material consumption of the reflection-suppressing deflection arrangement can be reduced.

FIG. 5a shows a perspective view of a possible arrangement of a visual field display apparatus 1 according to the above embodiment (for example, according to FIG. 1) in an upper side 7 of an instrument panel 8 of a motor vehicle 15. On account of its flat structure, the visual field display apparatus 1 can extend along the upper side 7 of the instrument panel 8, significantly beyond the edge 16a of a light emergence opening 16 of a projection unit of the conventional HUD structure as set forth at the outset, indicated in figure for comparison purposes. As described further above for FIG. 2a, the visual field display apparatus 1 can take up as much as the entire area of the upper side 7 of the instrument panel 8.

In FIG. 5a, a planar pixel arrangement 2 of the visual field display apparatus 1 takes up a portion of the upper side 7 of the instrument panel 8 of the motor vehicle 15 in front of the windshield 5, which is delimited by a quadrilateral contour 1a in purely exemplary fashion. The planar pixel arrangement 2 can be embodied, in particular, as one or more 2D or 3D flat screens which are arranged next to one another in a plane or nested or stepped fashion. In the direction of the windshield 5, the planar pixel arrangement 2 is covered by a reflection-suppressing deflection arrangement 3, the plurality of mutually parallel reflection surfaces 4 or light-absorbing back sides 11 of which being indicated by parallel stripes.

FIG. 5b shows the projection region 17 in the windshield 5 that is usable by the visual field display apparatus 1 of FIG. 5a, the boundary 17a of which corresponds to the contour 1a of the visual field display apparatus 1. In the upward direction, the projection region 17 extends identifiably clearly beyond the horizon and, in the lateral direction, it also covers a plurality of lanes of the road region in front of the motor vehicle 15 to be observed by the driver. On account of the correspondingly large solid angle or field of view of the visual field display apparatus 1, the latter is particularly suitable for contact-analog superimposition of virtual aid content into the visual field of the driver, depending on the real surroundings 20 in front of the motor vehicle 15. In particular, a true contact-analog 3D effect (stereo augmented reality) is possible with the visual field display apparatus 1:

To this end, the planar pixel arrangement 2 of FIG. 5a can be embodied for an autostereoscopic or 3D representation in a manner known per se, for example as per DE 10 2009 054 232 A1. Such a planar pixel arrangement 2 can be driven by an image generation unit and/or a control unit in such a way that two different 2D images reach the left and the right eye of the driver of the motor vehicle 15 in order to provide them with a spatial impression of the represented virtual display image. Using an autostereoscopic planar pixel arrangement 2, this allows representations perceived as three-dimensional to be generated at any distance between approximately 1 m and infinity in front of the eyes of the driver. In particular, all convergence planes are realizable at the same time in principle in this case, facilitating an immersion into a virtual 3D world.

FIG. 6 shows a schematic lateral cross-sectional view of a visual field display apparatus 1 according to FIG. 1 and FIG. 2a or 5a, the planar pixel arrangement 2 of which is embodied for the autostereoscopic representation in the manner described above. To this end, the planar pixel arrangement 2 comprises, for example, a luminous display 2a, e.g., a liquid crystal screen or any other standard display, which could also be used in a conventional HUD, for instance, and a microlens array 2b applied thereon or any other deflection means as per DE 10 2009 054 232 A1, which deflect light rays of different luminous points of the display 2a in different emission directions.

To drive the planar pixel arrangement 2 for the purposes of generating a contact-analog 3D effect for the user 6, provision is further made, in a manner known per se, of a control unit 24 for the display 2a and the microlens array 2b. By way of example, from an image generation unit 23, the control unit 24 can receive display content to be displayed as a virtual display image. Here, the image generation unit 23 can be embodied, in particular, to calculate a suitable stereoscopic representation of surrounding objects to be displayed to the user 6 and, to this end, receive data about current surroundings 20 ahead of the motor vehicle 15, for example from a surroundings capture unit 26, and/or a current eye position of the user 6 from an eye tracking unit 25, which may comprise one or more cameras, for example. The respective signal lines are indicated by arrows in FIG. 6.

Figure 9A:
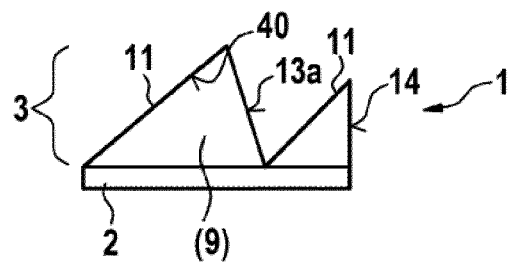
FIGS. 9a and 9b show schematic lateral cross-sectional views of further visual field display apparatuses according to the above embodiment.
Figure 9B:
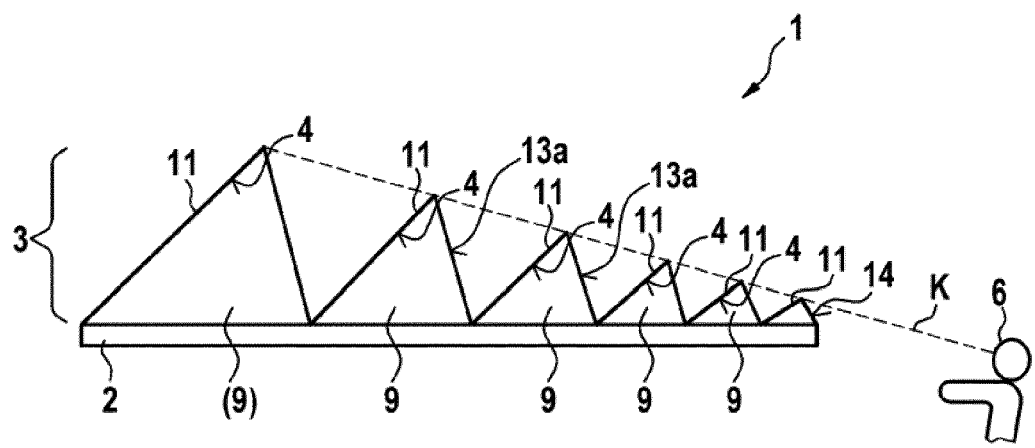

FIGS. 9a-9b each show in a schematic vertical cross-sectional view further specific configurations of the visual field display apparatus 1 according to the embodiment above. The reflection-suppressing deflection arrangement 3 of FIGS. 9a-9b differ from those in FIGS. 1 and 6 in that they have only a single large reflection surface 40 (FIG. 9a) or a plurality of reflection surfaces 4 with varying heights in relation to one another, perpendicular to the planar pixel arrangement 2 (FIG. 9b).

Using the visual field display apparatus 1 with a single large, e.g., approximately 6 cm high reflection surface 40 (in the direction perpendicular to the planar pixel arrangement 2) shown in FIG. 9a, it is already possible to obtain a field of view which is comparable in terms of the vertical direction to the conventional HUD in current motor vehicles mentioned at the outset. However, at the same time, the visual field display apparatus 1 of FIG. 9a can have a significantly wider embodiment than the conventional HUD in the horizontal direction on account of its flat structure, which may yield a correspondingly significantly larger field of view overall. Here, it is possible but not mandatory for the reflection surface 40 to be formed by a lateral side of a prism 9. Instead, the reflection surface 40 can also simply be a tilted mirror with a thickness that is required for the stability thereof and for keeping the user injury-free as this thickness has no influence on the virtual display image generated. This applies accordingly to the reflection surface 4 respectively arranged closest to the windshield 5 in FIGS. 1 and 6. Like in FIGS. 1 and 6, a dummy element with a light-absorbing cover surface 14 facing the user 6 and with a light-absorbing back side 11 parallel to the reflection surface 40 is arranged opposite the reflection surface 40 in FIG. 9a for the purposes of suppressing interfering reflections.

In FIG. 9b, the same as for the reflection surface 40 of FIG. 9a can apply to the first reflection surface 4 from the left, which is arranged closest to the windshield 5 in a motor vehicle, for example. As a result of further reflection surfaces 4, which are each successively reduced in height and, as shown in FIG. 9b, formed by correspondingly differently high prisms 9, an even larger field of view than in FIG. 9a is obtainable for the visual field display apparatus 1.

As a result of the successively reducing heights of the reflection surfaces 40, 4 or of the back sides 11 thereof in FIGS. 9a and 9b, the upper edges thereof can be aligned on a line K leading to the eyes of the user 6, for example even in the case of a section of the upper side 7 of the instrument panel 7 of the motor vehicle that has a more pronounced inclination with respect to the windshield 5 than in FIG. 1.

In the case of the visual field display apparatuses as shown in FIGS. 1 to 9b, a virtual display image can be generated at a fixed distance from the user 6 of slightly below or above one meter, approximately 1.2 m in the case of typical motor vehicle dimensions, using a planar pixel arrangement 2 which instead of an autostereoscopic screen comprises a 2D screen. Here, no eye tracking is needed either. Without eye tracking having to be evaluated, information, for example in respect of the vehicle state, can thus be displayed permanently in this region, e.g., as a replacement for a conventional instrument cluster.

Figure 10:
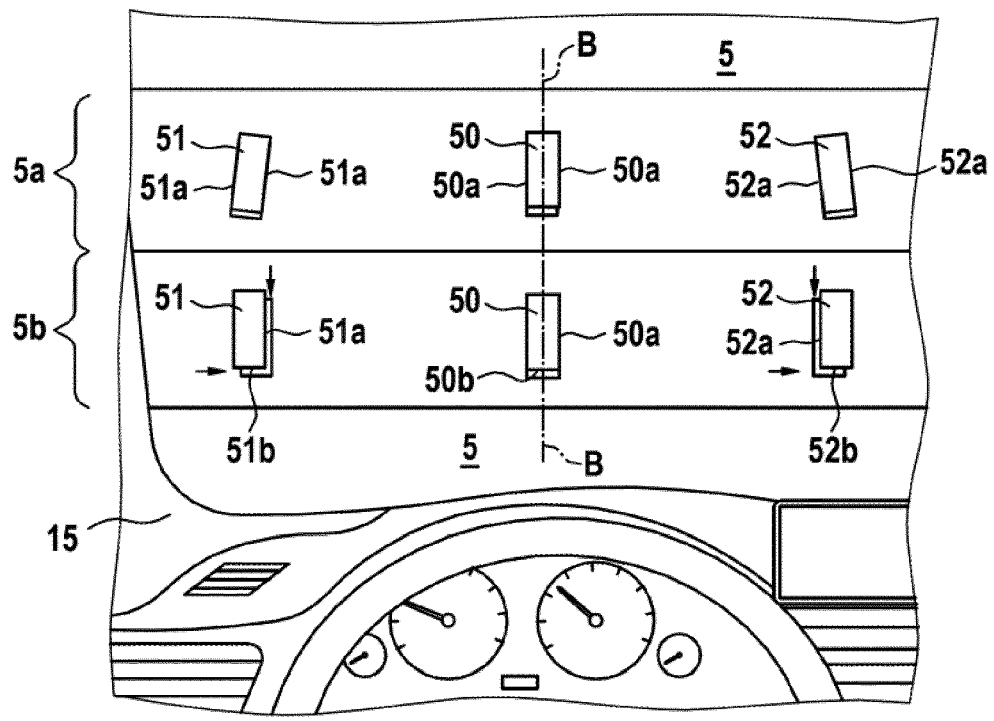
FIG. 10 shows a view through a windshield from the view of the driver, with examples of virtual display images which were generated by a visual field display apparatus with and without the method according to the invention.
Figure 11:
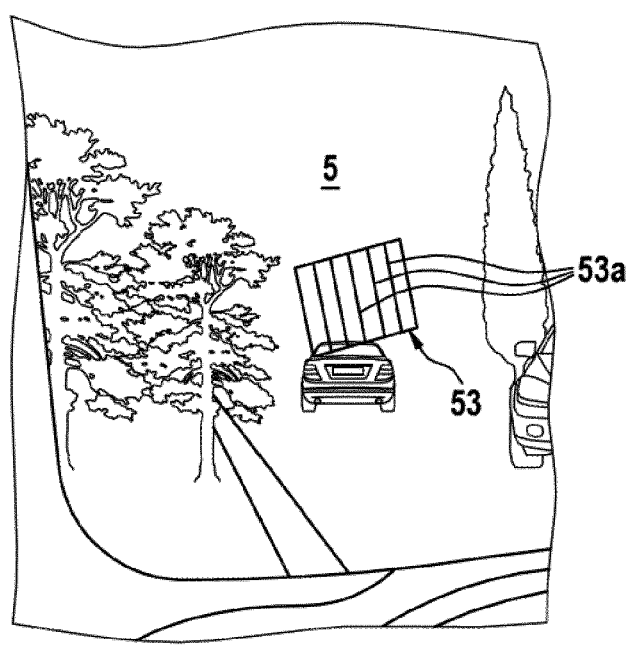
FIG. 11 shows a view through a windshield with a further example of sharp vertical lines in the virtual display image, generated by way of the method according to the invention by a visual field display apparatus.

FIGS. 10 and 11 elucidate the method according to the invention. FIG. 10 shows a view through a windshield 5 of a motor vehicle 15 from the view of the driver. Virtual display images 50, 51 and 52, which were generated by a visual field display apparatus using the steps presented herein for removing a horizontally offset double image, are shown in an upper windshield section 5a. For comparison purposes, the same but without the application of these steps is shown in a lower windshield section 5b. In particular, this can be a visual field display apparatus 1 according to the embodiment above (for example, according to FIGS. 1 to 9b), which has a horizontally wide field of view (for example, as shown in FIGS. 2a-2d, 5b).

As shown in the lower windshield section 5b of FIG. 10, the double reflection of the projection light beam L (cf. FIG. 1 or 6) at two optical interfaces of the windshield 5 (for example, the air-glass transition of the front and back surface thereof) leads to double images of the virtual display images 50, 51 and 52 in the case of a non-perpendicular incidence of the projection light on the windshield 5. For reasons of simplicity, the virtual display images 50, 51 and 52 represent rectangular boxes in this case, with vertical image element edges 50a, 51a and 52a and horizontal image element edges 50b, 51b and 52b. Without further countermeasures, the vertical image element edges 51a and 52a have horizontally offset double images, which are clearly visible to the user. (The vertical offset of the horizontal image element edges 50b, 51b and 52b is not considered here and can be removed, for example, in conventional fashion by way of a vertical wedge film.)

As shown in the upper windshield section 5a of FIG. 10, the vertical image element edges 50a, 51a and 52a, according to the method presented herein, are ascertained and tilted to a respectively adapted tilt angle in such a way that the horizontally offset double images of the vertical image element edges 51a and 52a coincide from the view of the user (coincidence), as a result of which the image element edges 51a and 52a appear precisely as a sharp edge in each case.

As is a further identifiable from FIG. 10, this depends greatly on the position of the virtual display images 50, 51 and 52 in the windshield 5 relative to the current position of the user (in this case, the driver of the motor vehicle 15). The latter can be characterized, for example, by a central visual axis B of the user, which is located in the windshield 5 and which specifies a viewing direction straight ahead through the windshield 5.

The further the virtual display images 51 and 52 are located to the left or right from the visual axis B, the greater the horizontal offset in the double images of the vertical image element edges 51a and 52a; this is therefore particularly relevant to visual display apparatuses with a broad field of view. By contrast, a horizontal offset of its vertical image element edges 50a is hardly noticeable in the case of the virtual display image 50 located close to the visual axis B. Therefore, it is also possible, for example, to ascertain a distance of the ascertained vertical image element edges 50a, 51a and 52a from the visual axis B and include this in the respective calculation of the adapted tilt angle, to which the ascertained image element edges 51a and 52a are then tilted in corresponding opposite directions to the left and right of the visual axis B.

By way of example, a calculation algorithm implemented in the control unit 24 can automatically ascertain image element edges 50a, 51a and 52a to be represented in vertical fashion and the distance thereof from the visual axis B, calculate the respective adapted tilt angle and accordingly adapt the display content to be transported by the projection light beam L within the scope of the image generation by the image generation unit 23 (cf. FIG. 6).

FIG. 11 shows a further example of sharp vertical lines 53a in a virtual display image 53 that are generated by a visual field display apparatus by application of the method according to the invention. In a manner quite analogous to FIG. 10, a driver's view through a windshield 5 of a motor vehicle is shown here, too, and so what was explained in respect of FIG. 10 analogously also applies to FIG. 11. In this example, the virtual display image 53 is an approximately square bright, in particular contact-analog marking of an object in the surroundings ahead of the motor vehicle in a section of the windshield 5 lying far to the right of the driver. The marking has a few narrow black vertical lines 53a, which extend along a side of the square. For a precise, i.e., sharp, representation of the lines 53a without a bothersome horizontally offset double image, the virtual display image 53 in FIG. 11 has been tilted from the vertical through a suitable adapted tilt angle.

Figure 7:
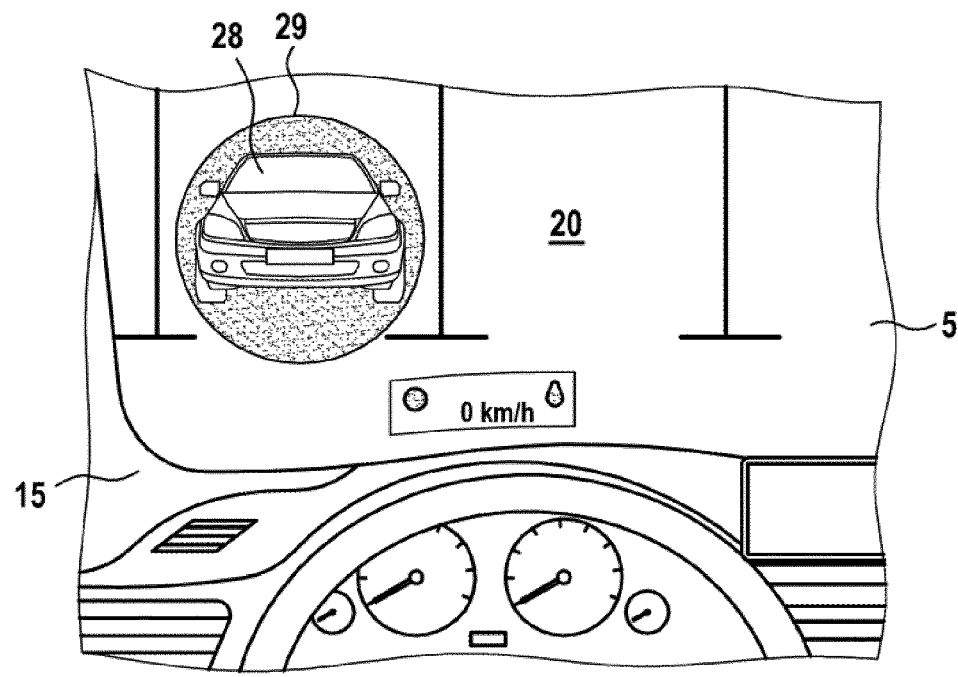
FIG. 7 shows a perspective windshield view from the view of the driver with a virtual marking of an external vehicle superimposed by the visual field display apparatus of FIG. 6 in contact-analog fashion.

Developments of this method for operating a visual field display apparatus 1 according to FIG. 6 are described with reference to FIGS. 5b, 7, and 8. (Here, the content 29, 30 and 31 superimposed in FIGS. 7 and 8 as virtual display images have no edge lines; instead, the indicated edge lines only serve the purpose of making things clearer to the reader.)

In one variant of the method, current surroundings 20 ahead of the motor vehicle 15 behind the windshield 5 are captured by the surroundings capture unit 26. Depending on the captured surroundings 20, information such as virtual object images and/or object markings for assisting the user 6 with navigation during independent or assisted travel or for visualizing/clarifying a driving situation captured by the motor vehicle 15 and its driving intent in the case of highly or fully automated driving (HAD/FAD) is superimposed in contact-analog fashion into the visual field of the user 6, in particular of the driver of the motor vehicle 15. Thus, a virtual turning arrow 27 is superimposed on the correct turning point in the street up ahead in contact-analog fashion in FIG. 5b, an external vehicle 28 in front of the own vehicle 15 detected in a parking lot in darkness is clearly visibly virtually marked using a colored circle, for example a red circle 29 in FIG. 7a, and a correct lane in front of the own vehicle 15 is visualized on a street without lane markings in FIG. 8 by a continuous colored, for example yellow, virtual lane marking 30 in the form of the entire lane to be driven.

Figure 8:
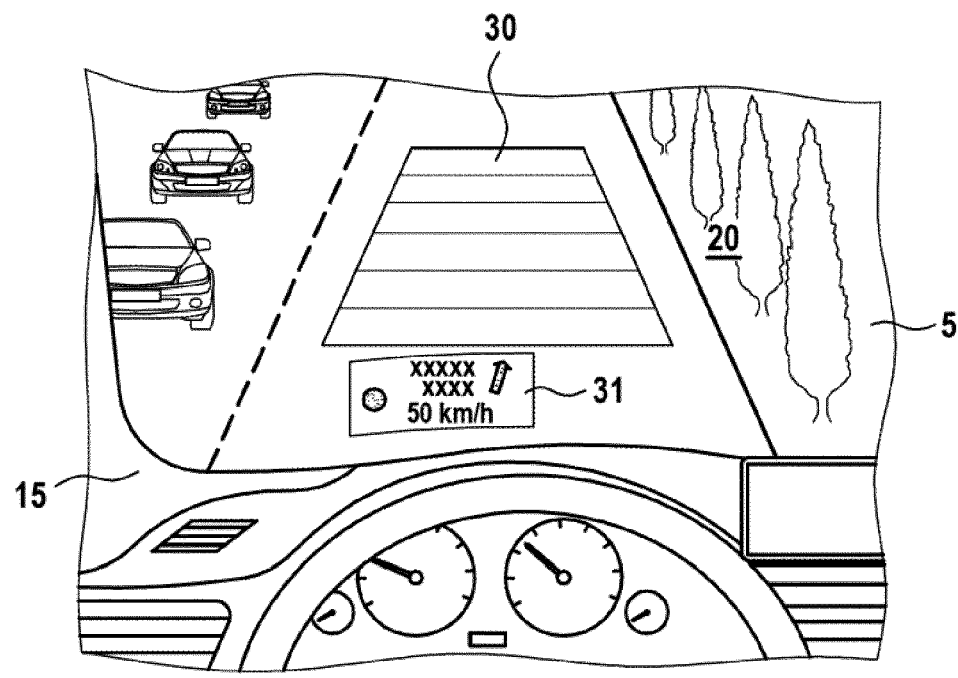
FIG. 8 shows a further perspective windshield view from the view of the driver with a virtual marking of a lane superimposed in contact-analog fashion by the visual field display apparatus of FIG. 6 and with further virtual display content statically superimposed by means of an additional conventional projection unit.

A further variant, combinable with the aforementioned variant of the method, is described on the basis of FIG. 8. In this case, the visual field display apparatus 1, in addition to the planar pixel arrangement 2 and the reflection-suppressing deflection arrangement 3, further comprises a conventional projection unit of the type set forth at the outset (not shown) for generating a further virtual display image 31 superimposed in a visual field of a user 6, in accordance with the aforementioned hybrid approach.

Here, the planar pixel arrangement 2 with the reflection-suppressing deflection arrangement 3 arranged thereon can be arranged in the upper side 7 of the instrument panel 8 of the motor vehicle 15, for example as indicated in FIG. 5*a*, next to the light emergence opening 16 of the projection unit, in particular directly adjoining the latter or around the latter. In particular, however, the light emergence opening 16 of the projection unit—unlike the conventional position thereof as shown in FIG. 5*a*— can be arranged closer to the window base of the windshield 5 and adjacent to the lower contour side of the planar pixel arrangement 2 of FIG. 5*a* and can have a more elongate embodiment in the horizontal direction than in FIG. 5*a* in order thus to be used to display the further virtual display image 31 lower below the horizon, for example immediately below the contact-analogous virtual display image generated by the planar pixel arrangement 2.

LIST OF REFERENCE SIGNS

1 Visual field display apparatus
1*a* Contour of the visual field display apparatus in an upper side of an instrument panel
2 Planar pixel arrangement
2*a* Display
2*b* Microlens array
3 Reflection-suppressing deflection arrangement
4, 40 Mutually parallel, inclined reflection surfaces of the reflection-suppressing deflection arrangement
5 Windshield
5*a*/5*b* Upper/lower windshield section
6 User of the visual field display apparatus
7 Upper side of the instrument panel
8 Instrument panel of a motor vehicle
9 Prism
9*a* Lower lateral side of a prism
10 Upper prism edge
11 Back sides of the reflection surfaces of the reflection-suppressing deflection arrangement, with a light-absorbing embodiment
12 Ambient light
13 Light emergence plane(s) of the reflection-suppressing deflection arrangement
13*a* Light emergence surface of a prism
14 Cover surface
15 Motor vehicle
16 Light emergence opening of a conventional HUD projection unit
16*a* Edge of the light emergence opening
17 Projection region of the visual field display apparatus in the windshield from the view of the driver
17*a* Boundary of the projection region from the view of the driver
18 Projection region of the visual field display apparatus in the windshield from the view of the front seat passenger
18*a* Boundary of the projection region from the view of the front seat passenger
19 Projection region of a conventional HUD projection unit
19*a* Boundary of the projection region of the conventional HUD projection unit
20 Surroundings up ahead or located behind the projection screen
21 Visible stripes
22 Non-visible stripes
23 Image generation unit
24 Control unit
25 Eye tracking unit
26 Surroundings capture unit
27 Contact-analog superimposed turning arrow
28 Captured external vehicle in front of the own motor vehicle
29 Contact-analog superimposed marking of the captured external vehicle
30 Contact-analog superimposed lane marking
31 Statically superimposed further virtual display image of an additionally provided conventional HUD projection unit
50, 51, 52, 53 Box-shaped virtual display images
50*a*, 51*a*, 52*a*, 53*a* Vertical image element edges
50*b*, 51*b*, 52*b*, 53*b* Horizontal image element edges
B (Central) visual axis of the user of the visual field display apparatus
L Projection light beam
A Cross-sectional area of a prism
K Line from the view of the user, lying on the upper edge of the plurality of reflection surfaces

What is claimed is:

1. A method for operating a visual field display apparatus for a motor vehicle, which visual field display apparatus is designed to generate a projection light beam with display content and to project the display content onto a partly transparent reflecting projection screen of the motor vehicle such that a virtual display image superimposed into a visual field of a user is generated therebehind,
the method comprising:
ascertaining vertical image element edges, or image element edges with a vertical component, in the virtual display image to be superimposed; and
tilting the image element edges thus ascertained to a respective tilt angle with respect to a vertical direction, which tilt angle is adapted in such a way that horizontally offset double images of the respective image element edges, which are caused by a double reflection of the projection light beam at two optical interfaces of the projection screen, are overlaid for the user in the virtual display image and consequently appear substantially sharp.

2. The method according to claim 1, further comprising:
providing a current position of the user; and
ascertaining the respective adapted tilt angle on the basis of the provided current position of the user.

3. The method according to claim 2, wherein
the current position of the user is an eye position or a visual axis of the user, and
the respective adapted tilt angle is ascertained on the basis of a distance of the respective ascertained vertical image element edge or of the respective ascertained image element edge with a vertical component from the visual axis of the user.

4. The method according to claim 1, wherein
the projection screen comprises an inclination element arranged between the two optical interfaces for overlaying, in the virtual display image to be superimposed, vertically offset double images of horizontal image element edges or image element edges with a horizontal component, the double images having been caused by the double reflection of the projection light beam at the two optical interfaces.

5. The method according to claim 4, wherein the inclination element is a wedge film.

6. The method according to claim 1, wherein vertically offset double images of horizontal image element edges or of image element edges with a horizontal component are hidden from the user in the virtual display image to be superimposed by way of providing the respective image elements with a texture having horizontal components, the double images having been caused by the double reflection of the projection light beam of the two optical interfaces of the projection screen.

7. The method according to claim 1, wherein the visual field display apparatus comprises:
an electrically drivable planar pixel arrangement for generating the projection light beam with display content;
a reflection-suppressing deflection arrangement arranged on the planar pixel arrangement and comprising one or more planar reflection surfaces, which extend along the planar pixel arrangement at a predefined acute angle thereto and parallel to one another, for purposes of projecting the generated projection light beam on the projection screen,
wherein the one or more reflection surfaces have a light-absorbing element on their back sides for purposes of suppressing interfering reflections.

8. The method according to claim 7, wherein at least one of the reflection surfaces of the reflection-suppressing deflection arrangement is formed by a lateral side of a prism arranged on the planar pixel arrangement, the prism having a triangular cross-sectional area.

9. The method according to claim 7, wherein for respectively two adjacent reflection surfaces, a light emergence plane, which connects an upper edge of the one reflection surface to a lower edge of a back side of the next reflection surface, is aligned substantially perpendicular to the projection screen during operation of the visual field display apparatus.

10. The method according to claim 7, wherein upper edges of the plurality of mutually parallel reflection surfaces of the reflection-suppressing deflection arrangement are located substantially along a line from the view of the user as a result of the following steps:
providing a current position of the user; and
aligning upper edges of the plurality of mutually parallel reflection surfaces of the reflection-suppressing deflection arrangement substantially along the line leading to eyes of the user on the basis of the current user position provided.

11. The method according to claim 7, wherein the planar pixel arrangement comprises at least one autostereoscopic screen and/or at least one 2D screen, the method further comprising:
capturing current surroundings behind the projection screen including surroundings ahead of the motor vehicle; and
superimposing contact-analog information including virtual object images and/or object markings into the visual field of the user by way of the at least one autostereoscopic screen and/or the at least one 2D screen on the basis of the captured surroundings for assisting the user during navigation or for clarifying a driving situation in case of highly automated or fully automated driving.

12. The method according to claim 7, wherein the visual field display apparatus further comprises a projection unit for generating a further virtual display image that is superimposed into the visual field of the user,
wherein the projection unit comprises, in its interior, both an imaging unit for generating a further projection light beam with further image content and a projection optical unit, arranged opposite the imaging unit, for projecting the generated further projection light beam onto a portion of the projection screen, wherein
the planar pixel arrangement with the reflection-suppressing deflection arrangement arranged thereon is arranged next to a light emergence opening of the projection unit directly adjoining the latter, around the latter, and/or flush with the edge of the latter, and
wherein the method further comprises:
providing system state data of a moving overarching system, and/or providing route data for a route section ahead; and
superimposing predetermined static information into the visual field of the user by way of the projection unit, the at least one autostereoscopic screen and/or the at least one 2D screen of the planar pixel arrangement, on the basis of the provided system state data and route data.

13. The method according to claim 12, wherein the moving overarching system is a motor vehicle, and the system state data is data about a current operating state of a motor or an energy store on board the motor vehicle.

14. A computer product comprising a non-transitory computer readable medium having stored thereon program code, that when executed in a control unit, carries out the acts of:
ascertaining vertical image element edges, or image element edges with a vertical component, in a virtual display image to be superimposed; and
tilting the image element edges thus ascertained to a respective tilt angle with respect to a vertical direction, which tilt angle is adapted in such a way that horizontally offset double images of the respective image element edges, which are caused by double reflection of a projection light beam at two optical interfaces of a projection screen, are overlaid for the user in the virtual display image and consequently appear substantially sharp.

15. A control unit for a visual field display apparatus comprising:
a processor and associated memory operatively configured to automatically:
ascertain vertical image element edges, or image element edges with a vertical component, in a virtual display image to be superimposed; and
tilt the image element edges thus ascertained to a respective tilt angle with respect to a vertical direction, which tilt angle is adapted in such a way that horizontally offset double images of the respective image element edges, which are caused by a double reflection of a projection light beam at two optical interfaces of a projection screen, are overlaid for the user in the virtual display image and consequently appear substantially sharp.

16. A motor vehicle comprising:

an upper side of an instrument panel extending between a windshield of the motor vehicle and the instrument panel;

a visual field display apparatus, arranged on, in or under the upper side of the instrument panel, for superimposing a virtual display image into a visual field of a driver and/or further occupants, in which an electrically drivable planar pixel arrangement for generating a projection light beam or a reflection-suppressing deflection arrangement, arranged thereon, with one or more plane reflection surfaces with light-absorbing back sides, which extend along the planar pixel arrangement at a predefined acute angle thereto and parallel to one another, for purposes of projecting the generated projection light beam on a projection screen is arranged substantially flush with the upper side of the instrument panel; and a control unit for the visual field display apparatus, the control unit comprising:

a processor and associated memory operatively configured to automatically:

ascertain vertical image element edges, or image element edges with a vertical component, in the virtual display image to be superimposed; and tilt the image element edges thus ascertained to a respective tilt angle with respect to a vertical direction, which tilt angle is adapted in such a way that horizontally offset double images of the respective image element edges, which are caused by a double reflection of the projection light beam at two optical interfaces of the projection screen, are overlaid for the user in the virtual display image and consequently appear substantially sharp.

* * * * *